United States Patent
Liu et al.

(10) Patent No.: US 11,651,164 B2
(45) Date of Patent: May 16, 2023

(54) METHOD, DEVICE, EQUIPMENT, AND STORAGE MEDIUM FOR MINING TOPIC CONCEPT

(71) Applicant: Beijing Baidu Netcom Science and Technology Co., Ltd., Beijing (CN)

(72) Inventors: Zhijie Liu, Beijing (CN); Qi Wang, Beijing (CN); Zhifan Feng, Beijing (CN); Zhou Fang, Beijing (CN); Chunguang Chai, Beijing (CN); Yong Zhu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 115 days.

(21) Appl. No.: 17/036,609

(22) Filed: Sep. 29, 2020

(65) Prior Publication Data
US 2021/0326535 A1    Oct. 21, 2021

(30) Foreign Application Priority Data
Apr. 15, 2020   (CN) .......................... 202010295520.5

(51) Int. Cl.
*G06F 40/30*    (2020.01)
*G06F 16/435*   (2019.01)
(Continued)

(52) U.S. Cl.
CPC .......... *G06F 40/30* (2020.01); *G06F 16/2465* (2019.01); *G06F 16/435* (2019.01);
(Continued)

(58) Field of Classification Search
CPC .... G06F 40/30; G06F 16/2465; G06F 16/435; G06F 40/253; G06F 40/279;
(Continued)

(56) References Cited

U.S. PATENT DOCUMENTS 5,537,317 A * 7/1996 Schabes ............... G06F 40/253
704/9
2013/0007025 A1   1/2013 Bao et al.
(Continued)

FOREIGN PATENT DOCUMENTS

CN      101727487 A    6/2010
CN      103793434 A    5/2014
(Continued)

OTHER PUBLICATIONS

Extended European Search Report corresponding to European Patent Application No. 20201845.3, dated Mar. 30, 2021 (9 pages).
(Continued)

*Primary Examiner* — Pierre Louis Desir
*Assistant Examiner* — Keisha Y. Castillo-Torres
(74) *Attorney, Agent, or Firm* — Maginot, Moore & Beck LLP (57) ABSTRACT

The present disclosure provides a method, a device, an equipment and a storage medium for mining a topic concept. The method includes: acquiring a plurality of candidate topic concepts based on a query; performing word segmentation on the plurality of candidate topic concepts and performing part-of-speech tagging on words obtained after performing the word segmentation, to obtain a part-of-speech sequence of each of the plurality of candidate topic concepts; and filtering the plurality of candidate topic concepts based on the part-of-speech sequence, to filter out a topic concept corresponding to a target part-of-speech sequence among the plurality of candidate topic concepts, in which a proportion of accurate topic concepts in the target part-of-speech sequence is lower than or equal to a first preset threshold, or a proportion of inaccurate topic concepts in the target part-of-speech sequence is higher than or equal to a second preset threshold.

15 Claims, 5 Drawing Sheets

(51) Int. Cl.
  *G06F 16/2458*  (2019.01)
  *G06F 40/253*   (2020.01)
  *G06F 40/279*   (2020.01)

(52) U.S. Cl.
  CPC .......... *G06F 40/253* (2020.01); *G06F 40/279* (2020.01); *G06F 2216/03* (2013.01)

(58) Field of Classification Search
  CPC .. G06F 2216/03; G06F 16/367; G06F 40/289; G06F 16/24528; G06F 40/117; G06F 40/268
  See application file for complete search history.

(56) References Cited

U.S. PATENT DOCUMENTS

| | | | | |
|---|---|---|---|---|
| 2015/0317303 A1* | 11/2015 | Zhang | ..................... | G06F 40/40 707/776 |
| 2016/0147891 A1* | 5/2016 | Chhichhia | ............. | G06F 16/986 707/734 |
| 2016/0314200 A1* | 10/2016 | Markman | ............. | G06F 16/334 |
| 2017/0075978 A1* | 3/2017 | Zhang | ................... | G06F 40/216 |

FOREIGN PATENT DOCUMENTS

| | | | | |
|---|---|---|---|---|
| CN | 104008090 | A | | 8/2014 |
| CN | 106294314 | A | | 1/2017 |
| CN | 108460011 | A | | 8/2018 |
| CN | 105354333 | B | | 11/2018 |
| CN | 111159557 | A | * | 5/2020 ......... G06F 16/9535 |
| JP | 2012243129 | A | * | 12/2012 |
| JP | 2012243129 | A | | 12/2012 |
| JP | 2014002653 | A | | 1/2014 |
| JP | 2015097026 | A | | 5/2015 |
| WO | 0010100 | A1 | | 2/2000 |
| WO | 2000010100 | A1 | | 2/2000 |
| WO | WO-0010100 | A1 | * | 2/2000 ........... G06F 17/271 |
| WO | 2018186599 | A1 | | 10/2018 |

OTHER PUBLICATIONS

Barrett Rick et al. "CoType: Joint Extraction of Typed Entities and Relations with Knowledge Bases", World Wide Web, [Online] Apr. 3, 2017 (Apr. 3, 2017), pp. 1015-1024, XP055786775, Republic and Canton of Geneva Switzerland DOI: 10.1145/3038912.3052708 ISBN: 978-1-4503-4913-0.

Shang Jingbo et al. "Automated Phrase Mining from Massive Text Corpora", IEEE Transactions on Knowledge and Data Engineering, [Online] vol. 30, No. 10, Mar. 11, 2017 (Mar. 11, 2017), pp. 1825-1837 XP055786870, DOI: 10.1145/1235.

Japanese Office Action corresponding to Japanese Patent Application No. 2020-188635, dated Dec. 3, 2021 (3 pages).

English Translation of Japanese Office Action corresponding to Japanese Patent Application No. 2020-188635, dated Dec. 3, 2021 (3 pages).

Machine Translation of JP201597026A (17 Pages).
Machine Translation of JP2014002653A (23 Pages).
Machine Translation of WO2018186599A1 (24 Pages).

Korean Office Action corresponding to Korean Patent Application No. 10-2020-0152767, dated Jul. 21, 2022 (8 pages).

English Translation of Korean Office Action corresponding to Korean Patent Application No. 10-2020-0152767, dated Jul. 21, 2022 (8 pages).

Machine Translation of JP2012243129A (14 Pages).

Loftsson, Hrafn. "Correcting a PoS-tagged corpus using three complementary methods." Proceedings of the 12th Conference of the European Chapter of the ACL (EACL 2009) 2009.

Chinese Office Action corresponding to Chinese Patent Application No. 202010295520.5, dated Feb. 7, 2023 (6 pages).

English Translation of Chinese Office Action corresponding to Chinese Patent Application No. 202010295520.5, dated Feb. 7, 2023 (3 pages).

Machine Translation of CN101727487A. (15 Pages).
Machine Translation of CN103793434A. (33 Pages).
Machine Translation of CN108460011A. (40 Pages).

* cited by examiner

METHOD, DEVICE, EQUIPMENT, AND STORAGE MEDIUM FOR MINING TOPIC CONCEPT

CROSS-REFERENCE TO RELATED APPLICATION

This application claims priority under 35 U.S.C. § 119 to Chinese Patent Application No. 202010295520.5 filed on Apr. 15, 2020 in China, the disclosure of which is incorporated in its entirety by reference herein.

TECHNICAL FIELD

The present disclosure relates to the field of knowledge graph technology in the field of computer technology, in particular, to a method, a device, an equipment, and a storage medium for mining a topic concept.

BACKGROUND

The topic concept mining technology can extract topic concepts from a large number of search logs, in which these topic concepts can be topic concepts describing a thing, an event, a person, etc. However, the current mining of the topic concept begins with a batch of seed topic concept templates, matching a seed query to obtain a candidate topic concept, and then matching more query based on the candidate topic concept, thereby obtaining a candidate template. After that, the candidate topic concepts corresponding to the candidate templates are filtered manually, to realize the mining the topic concept. Therefore, it needs a large labor cost for the current mining of the topic concept.

SUMMARY

This application provides a method, a device, an equipment, and a storage medium for mining a topic concept, to solve the problem that the mining the topic concept requires a large labor cost.

According to a first aspect, a method for mining a topic concept is provided. The method includes acquiring a plurality of candidate topic concepts based on a query. The method further includes performing word segmentation on the plurality of candidate topic concepts and performing part-of-speech tagging on words obtained after performing the word segmentation, to obtain a part-of-speech sequence of each of the plurality of candidate topic concepts. The method further includes filtering the plurality of candidate topic concepts based on the part-of-speech sequence, to filter out a topic concept corresponding to a target part-of-speech sequence among the plurality of candidate topic concepts, in which a proportion of accurate topic concepts in the target part-of-speech sequence is lower than or equal to a first preset threshold, or a proportion of inaccurate topic concepts in the target part-of-speech sequence is higher than or equal to a second preset threshold.

According to a second aspect, a device for mining a topic concept is provided. The device includes an acquisition module for acquiring a plurality of candidate topic concepts based on a query. The device further includes a word segmentation module for performing word segmentation on the plurality of candidate topic concepts and performing part-of-speech tagging on words obtained after performing the word segmentation, to obtain a part-of-speech sequence of each of the plurality of candidate topic concepts. The device further includes a filter module for filtering the plurality of candidate topic concepts based on the part-of-speech sequence, to filter out a topic concept corresponding to a target part-of-speech sequence among the plurality of candidate topic concepts, in which a proportion of accurate topic concepts in the target part-of-speech sequence is lower than or equal to a first preset threshold, or a proportion of inaccurate topic concepts in the target part-of-speech sequence is higher than or equal to a second preset threshold.

According to a third aspect, an electronic equipment is provided. The electronic equipment includes at least one processor and a memory communicatively connected with the at least one processor. The memory stores an instruction executable by the at least one processor, and the instruction are executed by the at least one processor, so that the at least one processor is capable of executing the method for mining the topic concept according to the present disclosure.

According to a fourth aspect, a non-transitory computer-readable storage medium storing computer instruction is provided, in which the computer instruction is configured to allow the computer execute the method for mining the topic concept according to the present disclosure.

According to the technical solution of the present disclosure, the candidate topic concepts are filtered through the part-of-speech sequence of the candidate topic concept, thereby reducing the labor cost required for mining the topic concept.

It should be understood that the content described in this section is neither intended to identify key or important features of the embodiments of the present disclosure, nor is it intended to limit the scope of the present disclosure. Other features of the present disclosure will be easily understood through the following description.

BRIEF DESCRIPTION OF THE DRAWINGS

The drawings are used to better understand the solution and do not constitute a limitation to the present disclosure. Among them.

DETAILED DESCRIPTION

The exemplary embodiments of the present disclosure will be described below in conjunction with the drawings, which include various details of the embodiments of the present disclosure to be helpful for understanding, and should be considered as merely exemplary. Therefore, those skilled in the art should recognize that various changes and modifications may be made to the embodiments described herein without departing from the scope and spirit of the present disclosure. Similarly, for clarity and conciseness, the descriptions of well-known functions and structures are omitted in the following description.

Figure 1:
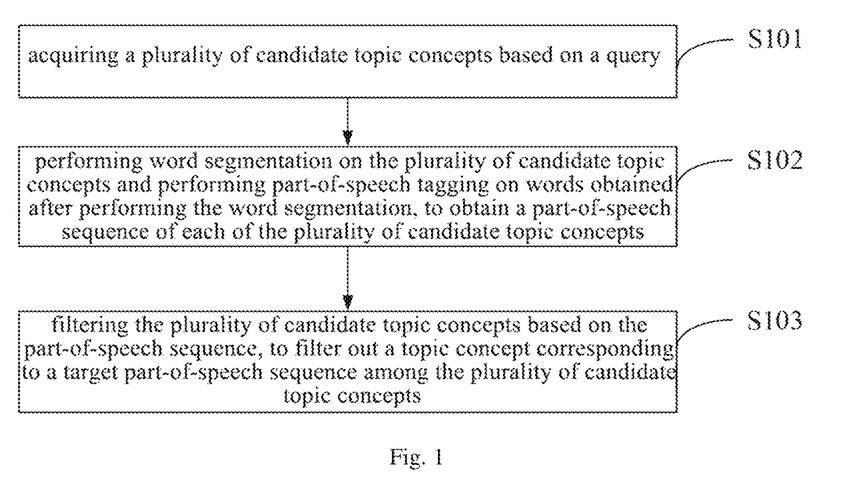
FIG. 1 is a flow chart showing a method for mining a topic concept according to the present disclosure.

FIG. 1 shows a flow chart of a method for mining a topic concept according to the present disclosure, which includes the following steps.

Step S101: acquiring a plurality of candidate topic concepts based on a query.

The above acquiring the plurality of candidate topic concepts based on the query may be to extract candidate topic concepts from the query input by a user, or may be to extract common candidate topic concepts from the query input by a user and the multimedia content (e.g., title) corresponding to the query.

In the present disclosure, the topic concept may represent one or more topic concepts, such as one or more things, one or more events, and one or more characters, which are not limited herein.

In addition, in the present disclosure, one or more candidate topic concepts can be extracted for one query, and the query in step S101 can be a plurality of queries.

It should be noted that the topic concept in the present disclosure can also be referred to as a topic concept graph.

Step S102: performing word segmentation on the plurality of candidate topic concepts and performing part-of-speech tagging on words obtained after performing the word segmentation, to obtain a part-of-speech sequence of each of the plurality of candidate topic concepts.

The above word segmentation may be to segment the words of each candidate topic concept, to obtain a plurality of words of the candidate topic concept. For example, the candidate topic concept "Tianjin Steel Plate Lease" is segmented into "Tianjin/Steel Plate/Lease". For another example, a candidate topic concept "Comparison Table of Gregorian Calendar and Lunar Calendar" is segmented into "Gregorian Calendar/Lunar Calendar/Comparison Table".

It should be noted that the word in the present disclosure can be a word, a phrase of a plurality of words, a phrase of a plurality of characters, or a character, that is, the number of words or characters included in the word in the present disclosure is not limited.

The above part-of-speech tagging on words obtained after performing the word segmentation may be to tag the part of speech of each word, such as a noun [n], a gerund [vn], an adjective [a], a verb [v], a conjunction [c], and a location noun [f].

The above part-of-speech sequence of candidate topic concepts may be a sequence of part of speech for each word used to represent the candidate topic concept. For example, if the word segmentation of the candidate topic concept "Tianjin Steel Plate Lease" is "Tianjin/Steel Plate/Lease", the word sequence can be expressed as ":n:vn", in which [:] can represent the part-of-speech separator. Of course, this is just an example. For example, [/] can be used to indicate the part-of-speech separator.

Step S103: filtering the plurality of candidate topic concepts based on the part-of-speech sequence, to filter out a topic concept corresponding to a target part-of-speech sequence among the plurality of candidate topic concepts, in which a proportion of accurate topic concepts in the target part-of-speech sequence is lower than or equal to a first preset threshold, or a proportion of inaccurate topic concepts in the target part-of-speech sequence is higher than or equal to a second preset threshold.

Among them, the above target part-of-speech sequence may be preconfigured, e.g., preset by a user, or obtained based on the statistics of candidate topic concepts. For example, the target part-of-speech sequence may include: v:v:, n:f, :c:f, and so on. In addition, the above target part-of-speech sequence may be one or more part-of-speech sequences.

In the present disclosure, the accurate topic concept may refer to a concept capable of reflecting an accurate topic, and the inaccurate topic concept may refer to a concept not capable of reflecting an accurate topic. Specifically, the present disclosure does not limit them. For example, the accurate topic concept and the inaccurate topic concept can also be set manually.

The topic concept corresponding to the above target part-of-speech sequence may refer to a candidate topic concept of the above target part-of-speech sequence.

The filtering the plurality of candidate topic concepts based on the part-of-speech sequence, to filter out the topic concept corresponding to a target part-of-speech sequence among the plurality of candidate topic concepts may be to delete the topic concept corresponding to the target part-of-speech sequence among the plurality of candidate topic concepts.

In addition, since the topic concept corresponding to the target part-of-speech sequence among the plurality of candidate topic concepts can be filtered out, the accuracy of the topic concepts can be improved.

The following table 2 is used to illustrate the filtering of the candidate topic concepts in the present disclosure.

TABLE 2

| Candidate Topic Concepts | Word Segmentation on Candidate Topic Concepts | Part-of-Speech Sequences | Filtered or Not |
|---|---|---|---|
| Tianjin Steel Plate Lease | Tianjin/Steel Plate/Lease | :n:vn | No |
| Comparison Table of Gregorian Calendar and Lunar Calendar | Gregorian Calendar/ Lunar Calendar/ Comparison Table | n:n:n | No |
| Huang Wenxiu's Advanced Deeds | Huang Wenxiu/ Advanced/Deeds | :a:n | No |
| Automatic Cat Litter Basin | Automatic/Cat Litter/Basin | a:n:n | No |
| Do not Marry a Man from Guilin | Marry a Man/Do not Marry/Guilin | v:v: | Yes |
| between hundreds' digit and tens' digit in a computer | hundreds' digit/and/ tens' digit/between computer/in | :c::f n:f | Yes Yes |

Among them, [:] is the part-of-speech separator. If there is no part-of-speech mark to tag before and after the separator, it means that the part of speech for the middle part of word is not recognized, in which [n] means [noun], [vn] means gerund, [a] means adjective, [v] means verb, [c] means conjunction, and [f] means location noun.

As can be determined from Table 2, whether the topic concept is accurate is strong correlated with the part-of-speech sequence. For example, the topic concept having the part-of-speech sequence of [verb+verb] has a lower proportion of accurate concepts, while the topic concept having the part-of-speech sequence of [noun+gerund] has a higher proportion of accurate concepts.

It should be noted that the present disclosure can be applied to electronic equipments, in which the electronic equipments can be servers, computers, and mobile phones.

The method according to the present disclosure includes: acquiring a plurality of candidate topic concepts based on a query; performing word segmentation on the plurality of candidate topic concepts and performing part-of-speech tagging on words obtained after performing the word segmentation, to obtain a part-of-speech sequence of each of the plurality of candidate topic concepts; and filtering the plurality of candidate topic concepts based on the part-of-speech sequence, to filter out a topic concept corresponding to a target part-of-speech sequence among the plurality of candidate topic concepts. Since the candidate topic concepts are filtered by the part-of-speech sequence of the candidate topic concepts, the labor cost required for mining the topic concepts can be reduced.

Figure 2:
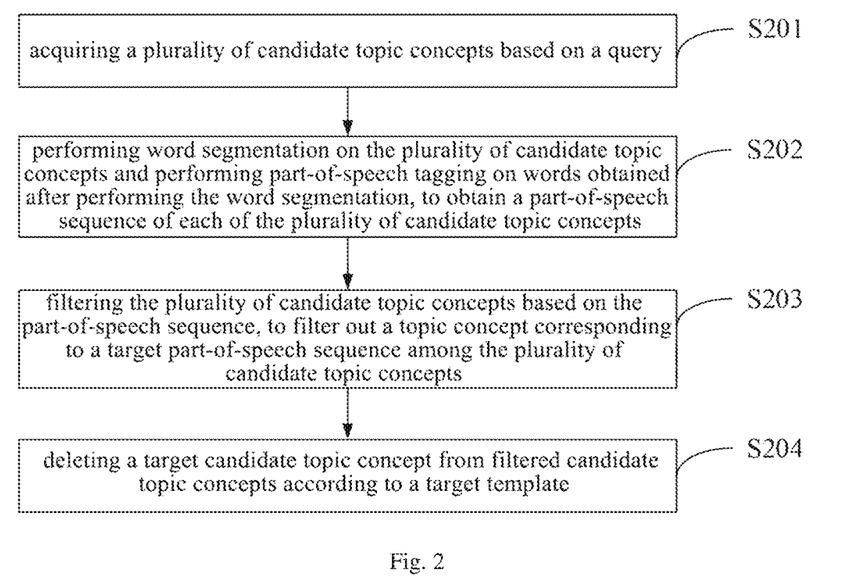
FIG. 2 is a flow chart of another method for mining a topic concept according to the present disclosure.

FIG. 2 shows a flow chart of another method for mining a topic concept according to the present disclosure, which includes the following steps.

Step S201: acquiring a plurality of candidate topic concepts based on a query.

As an optional embodiment, the acquiring the plurality of candidate topic concepts based on the query includes: performing word segmentation on a first query, to obtain a first word segmentation result; performing word segmentation on a first multimedia content, to obtain a second word segmentation result, in which the first multimedia content is a multimedia content hit by searching the first query; and determining a first candidate topic concept according to the first word segmentation result and the second word segmentation result, in which the first candidate topic concept is a word content in which a word continuously appears in the first query and a word continuously appears in the first multimedia content, and the first candidate topic concept is one of the plurality of candidate topic concepts.

Among them, the above first query may be one query in step 201, and a process corresponding to the first query may be executed for all the queries in step 201.

The above first multimedia content may be the multimedia content hit by searching the first query and clicked by a user, e.g., a linking title clicked by a user. Of course, it is not limited, for example, it may also be a multimedia content hit and preferentially recommended.

It should be noted that the multimedia content in the present disclosure may include at least one of a video, an audio, a picture, a text, etc.

The above word segmentation can adopt n-gram segmentation technology for word segmentation.

Figure 3:
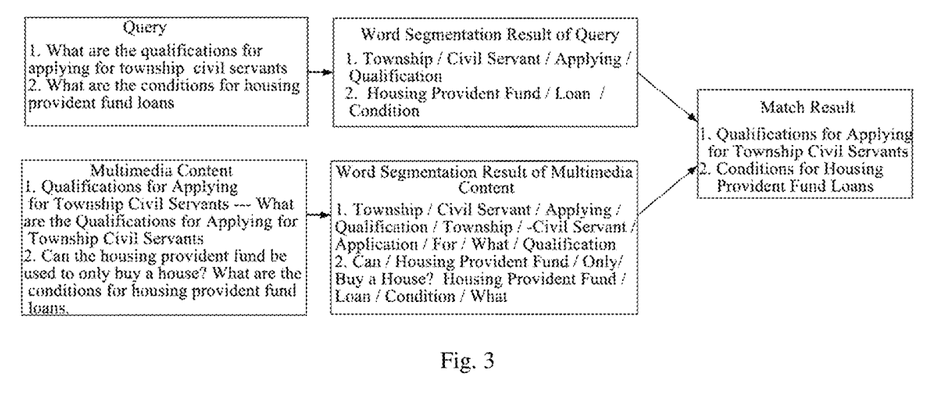
FIG. 3 is a schematic diagram showing an extraction of a candidate topic concept according to the present disclosure.

The above first candidate topic concept may be a n-gram continuous word co-occurring in the first query and the first multimedia content. For example, as shown in FIG. 3, the input query and multimedia content are segmented separately, and then the word segmentation result of the query is compared with the word segmentation result of the multimedia content, so as to determine the two candidate theme concepts, i.e., Qualifications for Applying for Township Civil Servants and Conditions for Housing Provident Fund Loans, for the query and multimedia content shown in FIG. 3.

It should be noted that the present disclosure does not limit the word segmentation to a n-gram word segmentation technology, and other word segmentation technologies can also be used for the word segmentation. The candidate topic concept is not limited to a n-gram continuous word. For example, the word content continuously appearing in the query can be compared with the word content continuously appearing in the multimedia content, to determine the word content co-occurring in the query and the multimedia content.

In this embodiment, since the candidate topic concept is a word content in which a word continuously appears in the first query and a word continuously appears in the first multimedia content, the accuracy of the candidate topic concept can be improved.

Optionally, the above first candidate topic concept is a longest one among a plurality of continuous contents, and the continuous content refers to a word content in which a word continuously appears in the first query and a word continuously appears in the first multimedia content.

Among them, the continuous content may include a plurality of words and continuously appear in the query and the multimedia content, and term "continuously" here refers to the appearance positions in the query and the multimedia content being continuous. In addition, different continuous content may or may not have an overlapping word.

In this embodiment, it can be realized that when there is a plurality of continuous word contents co-reproduced in the query and the multimedia content, the longest one can be selected, thereby mining more fine-grained topic concepts to more accurately reflect the corresponding topic information.

It should be noted that the acquiring the plurality of candidate topic concepts based on the query in the present disclosure is not limited to the above embodiments. For example, the candidate topic concept can also be determined only based on the query, or the candidate topic concept can be extracted from the query and the multimedia content by using the candidate topic concept template.

Step S202: performing word segmentation on the plurality of candidate topic concepts and performing part-of-speech tagging on words obtained after performing the word segmentation, to obtain a part-of-speech sequence of each of the plurality of candidate topic concepts.

Step S203: filtering the plurality of candidate topic concepts based on the part-of-speech sequence, to filter out a topic concept corresponding to a target part-of-speech sequence among the plurality of candidate topic concepts, in which a proportion of accurate topic concepts in the target part-of-speech sequence is lower than or equal to a first preset threshold, or a proportion of inaccurate topic concepts in the target part-of-speech sequence is higher than or equal to a second preset threshold.

As an optional embodiment, before the filtering the plurality of candidate topic concepts based on the part-of-speech sequence, to filter out the topic concept corresponding to the target part-of-speech sequence among the plurality of candidate topic concepts, the method further includes: tagging a part of topic concepts among the plurality of candidate topic concepts, to obtain a tagging result, the tagging result indicating whether each topic concept in the part of topic concepts is accurate, and a part-of-speech sequence of the part of topic concepts including the part-of-speech sequence of the plurality of candidate topic concepts; and counting a proportion of the accurate topic concepts or a proportion of the inaccurate topic concepts in each target part-of-speech sequence according to the tagging result.

Among them, the above partial topic concepts may be a part of topic concepts randomly extracted from the above plurality of candidate topic concepts.

The above tagging can be done manually to determine whether it is an accurate topic concept.

It should be noted that although the texts of different candidate topic concepts are different, the part-of-speech sequence of some candidate topic concepts may be the same. Therefore, the part-of-speech sequence of the above part of topic concepts may include the part-of-speech sequences of the plurality of candidate topic concepts.

In this embodiment, since a part of the candidate topic concepts are extracted, only a part of the candidate topic concepts need to be tagged, thereby reducing the workload.

Figure 4:
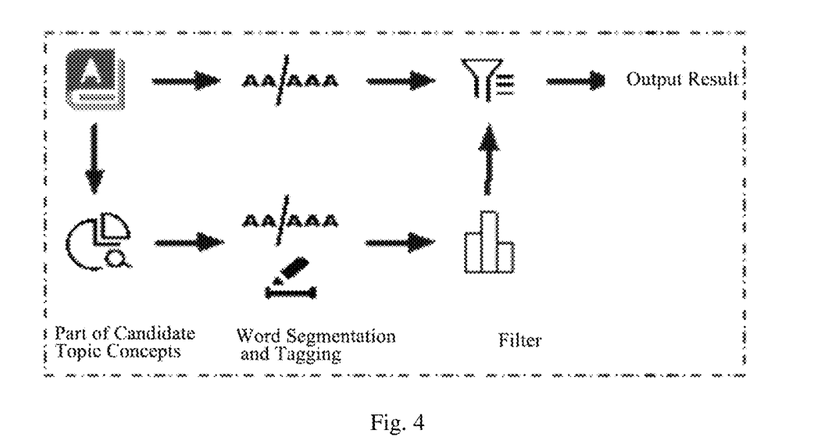
FIG. 4 is a schematic diagram showing a mining of a topic concept according to the present disclosure.

For example, as shown in FIG. 4, a part of topic concepts are extracted from a plurality of candidate topic concepts, and subjected to word segmentation and tagging. Then, the proportion of accurate topic concepts or the proportion of inaccurate topic concepts in each part-of-speech sequence is counted, and the above plurality of candidate topic concepts is filtered through these counting, to obtain an output result.

It should be noted that the determining the proportion of the accurate topic concept or the proportion of the inaccurate topic concept for the part-of-speech sequence in the present disclosure is not limited to the above manner. For example, a plurality of topic concepts different from the candidate topic concepts in step 201 and the corresponding part-of-speech sequences can be obtained in advance. The accuracy of these topic concepts can determine the proportion of accurate topic concepts or the proportion of inaccurate topic concepts in the part-of-speech sequence.

As an optional embodiment, as shown in FIG. 2, the method further includes Step 204: deleting a target candidate topic concept from filtered candidate topic concepts according to a target template, in which in the case that the target template is an inaccurate topic concept template, the target candidate topic concept is a topic concept matching the target template, or in the case that the target template is an accurate topic concept template, the target candidate topic concept is a topic concept not matching the target template among the filtered candidate topic concepts.

Figure 5:
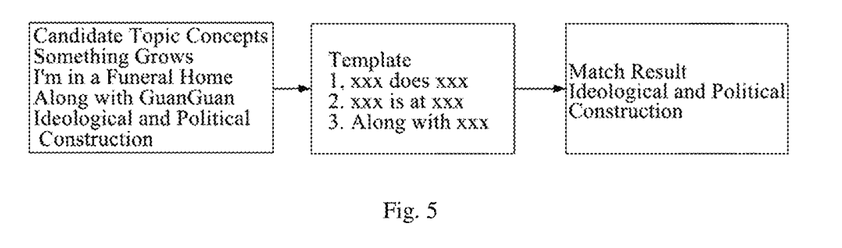
FIG. 5 is a schematic diagram showing a filtering of a topic concept according to the present disclosure.

Among them, the above target template may be preconfigured, e.g., set by a user. Taking the inaccurate topic concept template as an example, the three inaccurate topic concept templates shown in FIG. 5 can filter out inaccurate candidate topic concepts and retain the correct topic concepts. It should be noted that FIG. 5 is merely an example, and the ratio of inaccurate candidate topic concepts filtered in practical applications may be much lower than the ratio of inaccurate topic concepts shown in FIG. 5.

In the case that an accurate topic concept template is used, the candidate topic concept deleted from the above filtered candidate topic concepts can also be deleted.

In this embodiment, since the candidate topic concepts filtered in step 203 are filtered again, thereby further improving the accuracy of the topic concepts.

Figure 6:
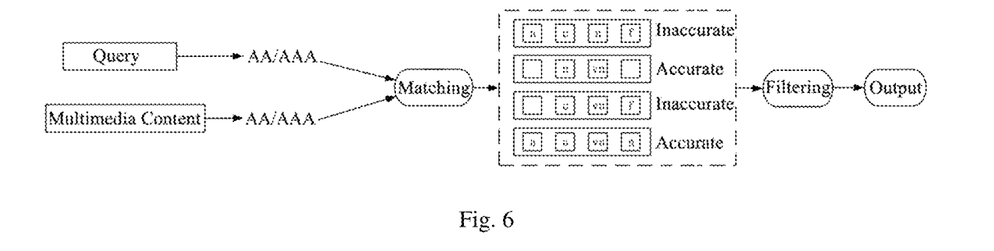
FIG. 6 is a schematic diagram showing another mining of a topic concept according to the present disclosure.

For example, as shown in FIG. 6, the query and multimedia content are subjected to word segmentation, and the word segmentations of the query and the multimedia content are matched, to determine a plurality of candidate topic concepts. Then, the part-of-speech sequence of each candidate topic concept is determined, and the inaccurate topic concept is filtered out and finally filtered through the template, to obtain the final output topic concept and to obtain the high-quality topic concept.

In this embodiment, a variety of optional embodiments are added on the basis of the embodiment shown in FIG. 1, and all of them can reduce the labor cost required for mining the topic concept, and achieve the beneficial effects of improving the accuracy of the topic concepts.

Figure 7:
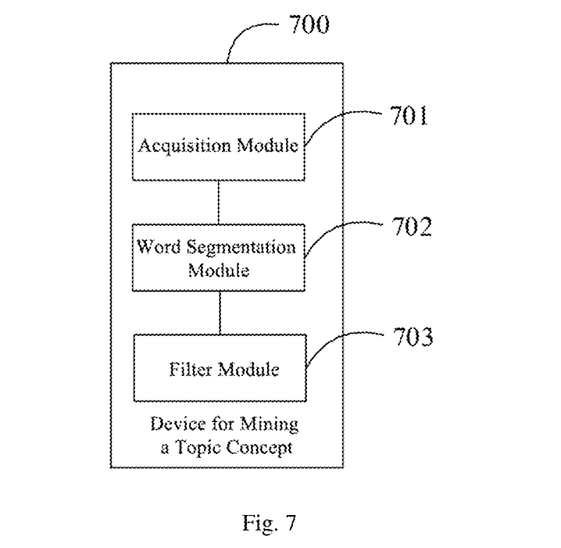
FIG. 7 is a diagram showing a structure of a device for mining a topic concept according to the present disclosure.

FIG. 7 shows a diagram of a structure of a device for mining a topic concept according to the present disclosure. As shown in FIG. 7, the device 700 for mining the topic concept includes: an acquisition module 701 for acquiring a plurality of candidate topic concepts based on a query; a word segmentation module 702 for performing word segmentation on the plurality of candidate topic concepts and performing part-of-speech tagging on words obtained after performing the word segmentation, to obtain a part-of-speech sequence of each of the plurality of candidate topic concepts; and a filter module 703 for filtering the plurality of candidate topic concepts based on the part-of-speech sequence, to filter out a topic concept corresponding to a target part-of-speech sequence among the plurality of candidate topic concepts, in which a proportion of accurate topic concepts in the target part-of-speech sequence is lower than or equal to a first preset threshold, or a proportion of inaccurate topic concepts in the target part-of-speech sequence is higher than or equal to a second preset threshold.

Figure 8:
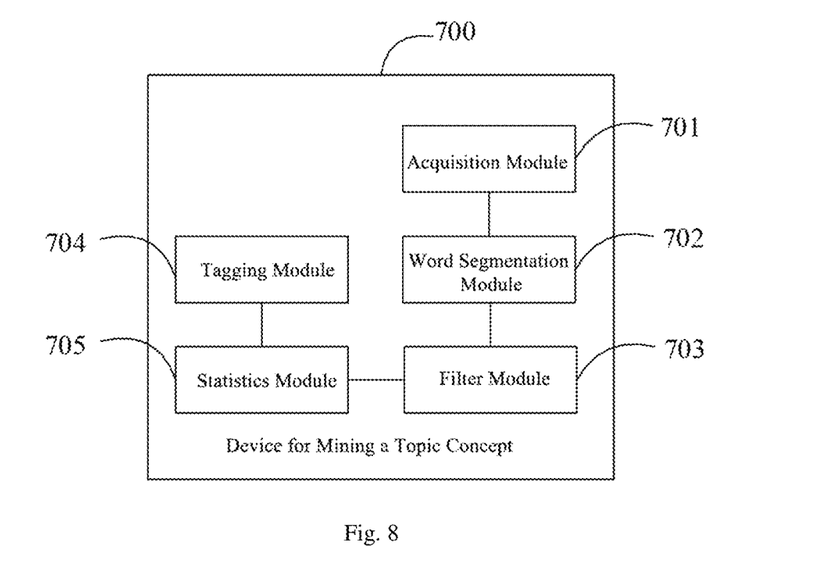
FIG. 8 is a diagram showing a structure of another device for mining a topic concept according to the present disclosure.

Optionally, as shown in FIG. 8, the device further includes: a tagging module 704 for tagging a part of topic concepts among the plurality of candidate topic concepts, to obtain a tagging result, the tagging result indicating whether each topic concept in the part of topic concepts is accurate, and a part-of-speech sequence of the part of topic concepts including the part-of-speech sequence of the plurality of candidate topic concepts; and a statistics module 705 for counting a proportion of the accurate topic concepts or a proportion of the inaccurate topic concepts in each target part-of-speech sequence according to the tagging result.

Figure 9:
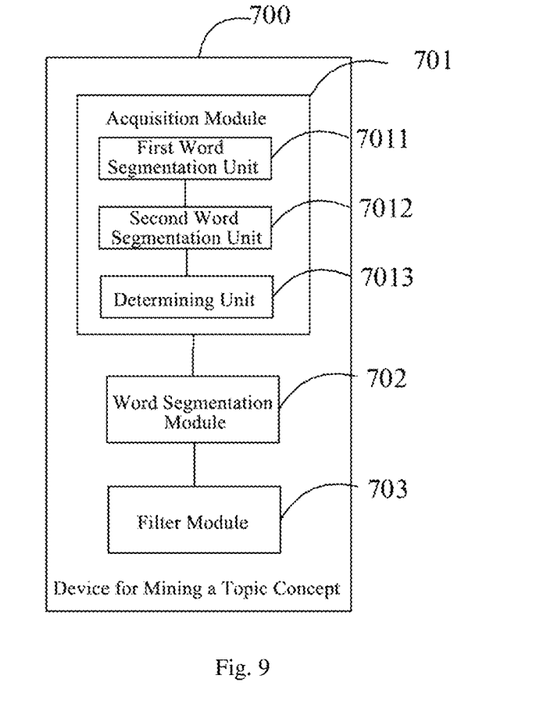
FIG. 9 is a diagram showing a structure of another device for mining a topic concept according to the present disclosure.

Optionally, as shown in FIG. 9, the acquiring module 701 includes: a first word unit 7011 for performing word segmentation on a first query, to obtain a first word segmentation result; a second word segmentation unit 7012 for performing word segmentation on a first multimedia content, to obtain a second word segmentation result, in which the first multimedia content is a multimedia content hit by searching the first query; and a determining unit 7013 for determining a first candidate topic concept according to the first word segmentation result and the second word segmentation result, in which the first candidate topic concept is a word content in which a word continuously appears in the first query and a word continuously appears in the first multimedia content, and the first candidate topic concept is one of the plurality of candidate topic concepts.

Optionally, the first candidate topic concept is a longest one among a plurality of continuous contents, and the continuous content refers to a word content in which a word continuously appears in the first query and a word continuously appears in the first multimedia content.

Figure 10:
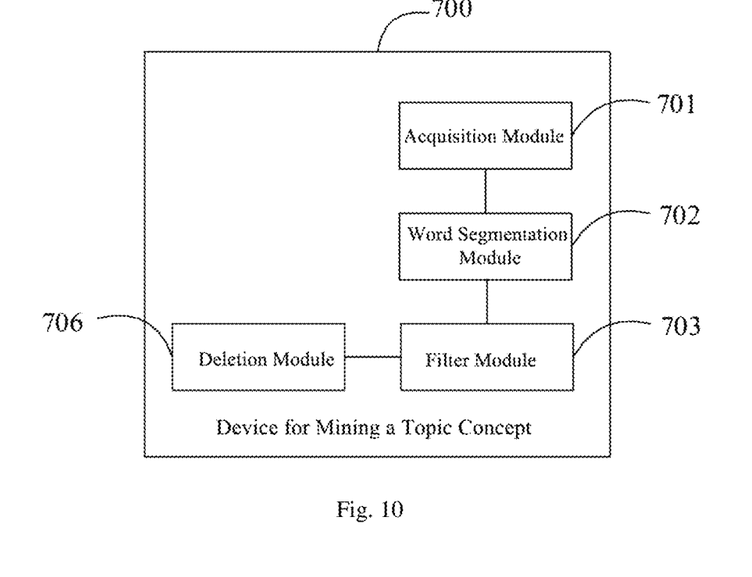
FIG. 10 is a diagram showing a structure of another device for mining a topic concept according to the present disclosure.

Optionally, as shown in FIG. 10, the device further includes: a deletion module 706 for deleting a target candidate topic concept from filtered candidate topic concepts according to a target template, in which in the case that the target template is an inaccurate topic concept template, the target candidate topic concept is a topic concept matching the target template, or in a case where the target template is an accurate topic concept template, the target candidate topic concept is a topic concept not matching the target template among the filtered candidate topic concepts.

The device according to this embodiment can implement each process implemented in the method embodiment of the present disclosure, and can achieve the same beneficial effects. To avoid repetition, the details are not repeated herein.

According to the embodiments of the present disclosure, the present disclosure also provides an electronic equipment and a readable storage medium.

Figure 11:
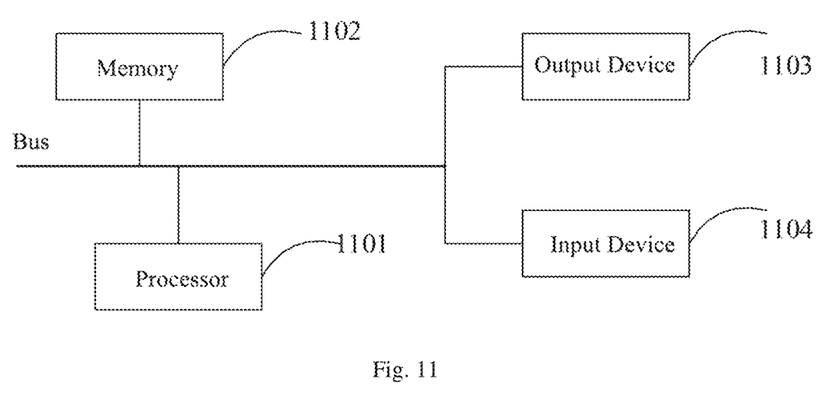
FIG. 11 is a block diagram showing an electronic equipment for realizing a method for mining a topic concept according to an embodiment of the present disclosure.

As shown in FIG. 11, it is a block diagram showing an electronic equipment for realizing a method for mining a topic concept according to an embodiment of the present disclosure. The electronic equipment is intended to represent various forms of digital computers, such as laptop computers, desktop computers, workstations, personal digital assistants, servers, blade servers, mainframe computers, and other suitable computers. The electronic equipment can also represent various forms of mobile devices, such as personal digital processing, cellular phones, smart phones, wearable devices, and other similar computing devices. The components, their connections and relationships, and their functions shown herein are merely examples, and are not intended to limit the implementation of the present disclosure described and/or required herein.

As shown in FIG. 11, the electronic equipment includes one or more processors 1101, memories 1102, and interfaces for connecting various components, including a high-speed interface and a low-speed interface. The various components are connected to each other by using different buses, and can be installed on a common motherboard or installed in other ways as needed. The processor may process instructions executed in the electronic equipment, including instructions stored in or on the memory to display graphical information of the GUI on an external input/output device (such as a display equipment coupled to an interface). In other embodiments, if necessary, a plurality of processors and/or a plurality of buses can be used along with a plurality of memories. Similarly, a plurality of electronic equipments can be connected, in which each device provides some necessary operations (for example, as a server array, a group of blade servers, or a multi-processor system). In FIG. 11, a processor 1101 is taken as an example.

The memory 1102 is the non-transitory computer-readable storage medium according to the present disclosure. Among them, the memory stores an instruction executable by at least one processor, so that the at least one processor executes the method for mining the topic concept according to the present disclosure. The non-transitory computer-readable storage medium of the present disclosure stores a computer instruction, in which the computer instruction is configured to allow a computer execute the method for mining the topic concept according to the present disclosure.

As a non-transitory computer-readable storage medium, the memory 1102 can be used to store a non-transitory software program, a non-transitory computer-executable program, and a module, e.g., a program instruction/module corresponding to the method for mining the topic concept in the embodiments of the present disclosure (for example, the acquisition module 701, the word segmentation module 702, and the filter module 703 shown in FIG. 7). The processor 1101 executes various functional applications of the server and data processing by running non-transitory software programs, instructions, and modules stored in the memory 1102, thereby realizing the method for mining the topic concept in the above method embodiment.

The memory 1102 may include a storage program area and a storage data area, in which the storage program area may store an operating system and an application program required by at least one function; and the storage data area may store data created by using the electronic equipment based on the method for mining the topic concept. In addition, the memory 1102 may include a high-speed random access memory, and may also include a non-transitory memory, e.g., at least one of a magnetic disk storage device, a flash memory device, or other non-transitory solid-state storage devices. In some embodiments, the memory 1102 may optionally include memories remotely arranged with respect to the processor 1101, and these remote memories may be connected to the electronic equipment of the method for mining the topic concept via a network. The examples of the above networks include, but are not limited to, the internet, a corporate intranet, a local area network, a mobile communication network, and a combination thereof.

The electronic equipment of the method for mining the topic concept may further include: an input device 1103 and an output device 1104. The processor 1101, the memory 1102, the input device 1103, and the output device 1104 may be connected by a bus or in other manners. In FIG. 11, a bus connection is taken as an example.

The input device 1103 can receive input digital or character information, and generate a key signal input related to the user setting and function control of the electronic equipment of the method for mining the topic concept, e.g., a touch screen, a keypad, a mouse, a track pad, a touch pad, a pointing stick, one or more mouse buttons, a trackball, a joystick and other input devices. The output device 1104 may include a display equipment, an auxiliary lighting device (e.g., LED), a tactile feedback device (e.g., a vibration motor), and the like. The display equipment may include, but is not limited to, a liquid crystal display (LCD), a light emitting diode (LED) display, and a plasma display. In some embodiments, the display equipment may be a touch screen.

Various embodiment of the systems and techniques described herein can be implemented in a digital electronic circuit system, an integrated circuit system, a specific ASIC (application specific integrated circuits), a computer hardware, firmware, a software, and/or a combination thereof. These various embodiments may include an embodiment that is implemented in one or more computer programs. The one or more computer programs may be executed and/or interpreted on a programmable system including at least one programmable processor. The programmable processor can be a dedicated or general programmable processor, and can receive data and instructions from the storage system, at least one input device, and at least one output device, and transmit the data and instructions to the storage system, the at least one input device, and the at least one output device.

These calculation programs (also known as programs, software, software applications, or codes) include machine instructions of programmable processors; and these calculation programs can be implemented by using high-level procedures and/or object-oriented programming languages, and/or assembly/machine languages. As used herein, the terms "machine-readable medium" and "computer-readable medium" refer to any computer program product, equipment, and/or device (e.g., a magnetic disk, an optical disk, a memory, a programmable logic device (PLD)) used to provide machine instructions and/or data to a programmable processor, including a machine-readable medium that receive the machine instructions as a machine-readable signal. The term "machine-readable signal" refers to any signal for providing the machine instructions and/or data to a programmable processor.

In order to provide an interaction with a user, the systems and techniques described herein can be implemented on a computer. The computer has a display equipment (for example, a CRT (cathode ray tube) or LCD (liquid crystal display) monitor)) for displaying an information to a user; and a keyboard and a pointing device (e.g., a mouse or a trackball). The user can provide an input to the computer through the keyboard and the pointing device. Other types of devices can also be used to provide an interaction with the user; for example, the feedback provided to the user can be any form of sensory feedback (e.g., a visual feedback, an auditory feedback, or a tactile feedback); and can receive input in any form (including an acoustic input, a voice input, or a tactile input) from the user.

The systems and technologies described herein can be implemented in a computing system including background components (e.g., as a data server), a computing system including middleware components (e.g., an application server), a computing system including front-end components (e.g., a user computer having a graphical user interface or a web browser, through which the user can interact with the implementation of the system and technology described herein), or a computing system including any combination of the background components, the middleware components or the front-end components. The components of the system can be connected to each other through digital data communication in any form or medium (e.g., a communication network). Examples of communication networks include: a local area network (LAN), a wide area network (WAN), and the internet.

The computer system can include clients and servers. The clients and servers are generally far away from each other and usually interact through a communication network. The relationship between the client and the server is generated by a computer program running on a corresponding computer and having a client-server relationship with each other.

According to the technical solution of the present disclosure, the candidate topic concepts are filtered through the part-of-speech sequence of the candidate topic concept, thereby reducing the labor cost required for mining the topic concept.

It should be understood that the various forms of processes shown above can be used to reorder, add or delete steps. For example, the steps described in the present disclosure can be executed in parallel, sequentially, or in a different order, as long as the desired result of the technical solution disclosed in the present disclosure can be achieved, and thus them are not limited herein.

The above specific embodiments do not constitute a limitation on the protection scope of the present disclosure. Those skilled in the art should understand that various modifications, combinations, sub-combinations and substitutions can be made according to design requirements and other factors. Any amendments, equivalent substitutions and improvements made within the spirit and principle of the present disclosure shall be included in the protection scope of the present disclosure.

What is claimed is:

1. A method for mining a topic concept in a search text, which is performed by a computer, wherein the computer comprises one or more processors, a memory, one or more interfaces for connecting the one or more processors and the memory, an input device, and an output device, the method comprising:
    acquiring, through calling and executing a program stored in the memory by the one or more processors, a plurality of candidate topic concepts in the search text outputted by the output device based on a query inputted by the input device, wherein each of the plurality of candidate topic concepts in the search text comprises (i) one or more things, (ii) one or more events, or (iii) one or more characters;
    performing, through calling and executing the program stored in the memory by the one or more processors, word segmentation on the plurality of candidate topic concepts and performing part-of-speech tagging on a plurality of words respectively obtained after performing the word segmentation, to obtain a part-of-speech sequence of each of the plurality of candidate topic concepts, wherein the part-of-speech tagging on the plurality of words respectively obtained after performing the word segmentation comprises tagging a part of speech of each word of the plurality of words obtained after performing the word segmentation, and wherein the part-of-speech sequence of each of the plurality of candidate topic concepts is a sequence that includes one or more parts of speech and one or more part-of-speech separators for each word used to represent each of the plurality of candidate topic concepts; and
    filtering through the plurality of candidate topic concepts, through calling and executing the program stored in the memory by the one or more processors, by using a candidate topic concept template preset in advance, based on the part-of-speech sequence, to select one or more candidate topic concepts that meet at least one requirement preset in advance among the plurality of candidate topic concepts, wherein the candidate topic concept template preset in advance comprises one or more accurate topic concepts preset in advance or one or more inaccurate topic concepts preset in advance,
    wherein when the candidate topic concept template preset in advance comprises the one or more accurate topic concepts preset in advance, one or more candidate topic concepts that do match the candidate topic concept template preset in advance are selected among the plurality of candidate topic concepts; or
    wherein when the candidate topic concept template preset in advance comprises the one or more inaccurate topic concepts preset in advance, one or more candidate topic concepts that do not match the candidate topic concept template preset in advance are selected among the plurality of candidate topic concepts.

2. The method according to claim 1, before the filtering through the plurality of candidate topic concepts, through calling and executing the program stored in the memory by the one or more processors, to select one or more candidate topic concepts that meet the at least one requirement preset in advance among the plurality of candidate topic concepts, the method further comprising:
    tagging, through calling and executing the program stored in the memory by the one or more processors, a part of topic concepts among the plurality of candidate topic concepts, to obtain a tagging result, the tagging result indicating whether each topic concept in the part of topic concepts is accurate, and a part-of-speech sequence of the part of topic concepts including the part-of-speech sequence of the plurality of candidate topic concepts; and
    counting, through calling and executing the program stored in the memory by the one or more processors, one of (i) a proportion of the accurate topic concepts and (ii) a proportion of the inaccurate topic concepts, in each target part-of-speech sequence according to the tagging result.

3. The method according to claim 1, wherein the acquiring, through calling and executing the program stored in the memory by the one or more processors, the plurality of candidate topic concepts in the search text outputted by the output device based on the query inputted by the input device comprises:
    performing, through calling and executing the program stored in the memory by the one or more processors, word segmentation on a first query to obtain a first word segmentation result;
    performing, through calling and executing the program stored in the memory by the one or more processors, word segmentation on a first multimedia content to obtain a second word segmentation result, wherein the first multimedia content is a multimedia content hit by searching the first query; and determining, through calling and executing the program stored in the memory by the one or more processors, a first candidate topic concept according to the first word segmentation result and the second word segmentation result, wherein the first candidate topic concept is a word content in which a word continuously appears in the first query and a word continuously appears in the first multimedia content, and the first candidate topic concept is one of the plurality of candidate topic concepts.

4. The method according to claim 3, wherein the first candidate topic concept is a longest one among a plurality of continuous contents, the plurality of continuous contents being a word content in which a word continuously appears in the first query and a word continuously appears in the first multimedia content.

5. The method according to claim 1, after the filtering through the plurality of candidate topic concepts, through calling and executing the program stored in the memory by the one or more processors, to select one or more candidate topic concepts that meet the at least one requirement preset in advance among the plurality of candidate topic concepts, the method further comprising:

deleting, through calling and executing the program stored in the memory by the one or more processors, a target candidate topic concept from filtered candidate topic concepts according to a target template, wherein one of (i) in a case that the target template is an inaccurate topic concept template, the target candidate topic concept is a topic concept matching the target template, and (ii) in a case that the target template is an accurate topic concept template, the target candidate topic concept is a topic concept not matching the target template among the filtered candidate topic concepts.

6. An electronic equipment comprising:

one or more processors;

a memory communicatively connected with the one or more processors;

one or more interfaces for connecting the one or more processors and the memory;

an input device; and an output device, the memory storing one or more program instructions for mining a topic concept in a search text, wherein the one or more processors are configured to execute the one or more program instructions so as to realize a method for mining the topic concept in the search text, which is performed by the electronic equipment, the method comprising:

acquiring, through calling and executing a program stored in the memory by the one or more processors, a plurality of candidate topic concepts in the search text outputted by the output device based on a query inputted by the input device, wherein each of the plurality of candidate topic concepts in the search text comprises (i) one or more things, (ii) one or more events, or (iii) one or more characters;

performing, through calling and executing the program stored in the memory by the one or more processors, word segmentation on the plurality of candidate topic concepts and performing part-of-speech tagging on a plurality of words respectively obtained after performing the word segmentation, to obtain a part-of-speech sequence of each of the plurality of candidate topic concepts, wherein the part-of-speech tagging on the plurality of words respectively obtained after performing the word segmentation comprises tagging a part of speech of each word of the plurality of words obtained after performing the word segmentation, and wherein the part-of-speech sequence of each of the plurality of candidate topic concepts is a sequence that includes one or more parts of speech and one or more part-of-speech separators for each word used to represent each of the plurality of candidate topic concepts; and filtering through the plurality of candidate topic concepts, through calling and executing the program stored in the memory by the one or more processors, by using a candidate topic concept template preset in advance, based on the part-of-speech sequence, to select one or more candidate topic concepts that meet at least one requirement preset in advance among the plurality of candidate topic concepts, wherein the candidate topic concept template preset in advance comprises one or more accurate topic concepts preset in advance or one or more inaccurate topic concepts preset in advance, wherein when the candidate topic concept template preset in advance comprises the one or more accurate topic concepts preset in advance, one or more candidate topic concepts that do match the candidate topic concept template preset in advance are selected among the plurality of candidate topic concepts; or wherein when the candidate topic concept template preset in advance comprises the one or more inaccurate topic concepts preset in advance, one or more candidate topic concepts that do not match the candidate topic concept template preset in advance are selected among the plurality of candidate topic concepts.

7. The electronic equipment according to claim 6, before the filtering through the plurality of candidate topic concepts, through calling and executing the program stored in the memory by the one or more processors, to select one or more candidate topic concepts that meet the at least one requirement preset in advance among the plurality of candidate topic concepts, the method further comprising:

tagging, through calling and executing the program stored in the memory by the one or more processors, a part of topic concepts among the plurality of candidate topic concepts, to obtain a tagging result, the tagging result indicating whether each topic concept in the part of topic concepts is accurate, and a part-of-speech sequence of the part of topic concepts including the part-of-speech sequence of the plurality of candidate topic concepts; and counting, through calling and executing the program stored in the memory by the one or more processors, one of (i) a proportion of the accurate topic concepts and (ii) a proportion of the inaccurate topic concepts, in each target part-of-speech sequence according to the tagging result.

8. The electronic equipment according to claim 6, wherein the acquiring, through calling and executing the program stored in the memory by the one or more processors, the plurality of candidate topic concepts in the search text outputted by the output device based on the query inputted by the input device comprises:

performing, through calling and executing the program stored in the memory by the one or more processors, word segmentation on a first query to obtain a first word segmentation result;

performing, through calling and executing the program stored in the memory by the one or more processors, word segmentation on a first multimedia content to obtain a second word segmentation result, wherein the first multimedia content is a multimedia content hit by searching the first query; and determining, through calling and executing the program stored in the memory by the one or more processors, a first candidate topic concept according to the first word segmentation result and the second word segmentation result, wherein the first candidate topic concept is a word content in which a word continuously appears in the first query and a word continuously appears in the first multimedia content, and the first candidate topic concept is one of the plurality of candidate topic concepts.

9. The electronic equipment according to claim 8, wherein the first candidate topic concept is a longest one among a plurality of continuous contents, the plurality of continuous contents being a word content in which a word continuously appears in the first query and a word continuously appears in the first multimedia content.

10. The electronic equipment according to claim 6, after the filtering through the plurality of candidate topic concepts, through calling and executing the program stored in the memory by the one or more processors, to select one or more candidate topic concepts that meet at least one requirement preset in advance among the plurality of candidate topic concepts, the method further comprising:

deleting, through calling and executing the program stored in the memory by the one or more processors, a target candidate topic concept from filtered candidate topic concepts according to a target template, wherein one of (i) in a case that the target template is an inaccurate topic concept template, the target candidate topic concept is a topic concept matching the target template, and (ii) in a case that the target template is an accurate topic concept template, the target candidate topic concept is a topic concept not matching the target template among the filtered candidate topic concepts.

11. A non-transitory computer-readable storage medium, wherein the non-transitory computer-readable storage medium stores a computer program, and when the computer program is executed by one or more processors of an electronic equipment, the steps of a method for mining a topic concept in a search text are implemented, wherein the electronic equipment comprises the one or more processors, a memory, one or more interfaces for connecting the one or more processors and the memory, an input device, and an output device, the method comprising:

acquiring, through calling and executing a program stored in the memory by the one or more processors, a plurality of candidate topic concepts in the search text outputted by the output device based on a query inputted by the input device, wherein each of the plurality of candidate topic concepts in the search text comprises: (i) one or more things, (ii) one or more events, or (iii) one or more characters;

performing, through calling and executing the program stored in the memory by the one or more processors, word segmentation on the plurality of candidate topic concepts and performing part-of-speech tagging on a plurality of words respectively obtained after performing the word segmentation, to obtain a part-of-speech sequence of each of the plurality of candidate topic concepts; wherein the part-of-speech tagging on the plurality of words respectively obtained after performing the word segmentation comprises tagging a part of speech of each word of the plurality of words obtained after performing the word segmentation; and wherein the part-of-speech sequence of each of the plurality of candidate topic concepts is a sequence that includes one or more parts of speech and one or more part-of-speech separators for each word used to represent each of the plurality of candidate topic concepts; and filtering through the plurality of candidate topic concepts, through calling and executing the program stored in the memory by the one or more processors, by using a candidate topic concept template preset in advance, based on the part-of-speech sequence, to select one or more candidate topic concepts that meet the at least one requirement preset in advance among the plurality of candidate topic concepts, wherein the candidate topic concept template preset in advance comprises one or more accurate topic concepts preset in advance or one or more inaccurate topic concepts preset in advance, wherein when the candidate topic concept template preset in advance comprises the one or more accurate topic concepts preset in advance, one or more candidate topic concepts that do match the candidate topic concept template preset in advance are selected among the plurality of candidate topic concepts; or wherein when the candidate topic concept template preset in advance comprises the one or more inaccurate topic concepts preset in advance, one or more candidate topic concepts that do not match the candidate topic concept template preset in advance are selected among the plurality of candidate topic concepts.

12. The non-transitory computer-readable storage medium according to claim 11, before the filtering through the plurality of candidate topic concepts, through calling and executing the program stored in the memory by the one or more processors, to select one or more candidate topic concepts that meet the at least one requirement preset in advance among the plurality of candidate topic concepts, the method further comprising:

tagging, through calling and executing the program stored in the memory by the one or more processors, a part of topic concepts among the plurality of candidate topic concepts, to obtain a tagging result, the tagging result indicating whether each topic concept in the part of topic concepts is accurate, and a part-of-speech sequence of the part of topic concepts including the part-of-speech sequence of the plurality of candidate topic concepts; and counting, through calling and executing the program stored in the memory by the one or more processors, one of (i) a proportion of the accurate topic concepts and (ii) a proportion of the inaccurate topic concepts, in each target part-of-speech sequence according to the tagging result.

13. The non-transitory computer-readable storage medium according to claim 11, wherein the acquiring, through calling and executing the program stored in the memory by the one or more processors, the plurality of candidate topic concepts in the search text outputted by the output device based on the query inputted by the input device comprises:

performing, through calling and executing the program stored in the memory by the one or more processors, word segmentation on a first query to obtain a first word segmentation result;

performing, through calling and executing the program stored in the memory by the one or more processors, word segmentation on a first multimedia content to obtain a second word segmentation result, wherein the first multimedia content is a multimedia content hit by searching the first query; and determining, through calling and executing the program stored in the memory by the one or more processors, a first candidate topic concept according to the first word segmentation result and the second word segmentation result, wherein the first candidate topic concept is a word content in which a word continuously appears in the first query and a word continuously appears in the first multimedia content, and the first candidate topic concept is one of the plurality of candidate topic concepts.

14. The non-transitory computer-readable storage medium according to claim 13, wherein the first candidate topic concept is a longest one among a plurality of continuous contents, the plurality of continuous contents being a word content in which a word continuously appears in the first query and a word continuously appears in the first multimedia content.

15. The non-transitory computer-readable storage medium according to claim 11, after the filtering through the plurality of candidate topic concepts, through calling and executing the program stored in the memory by the one or more processors, to select one or more candidate topic concepts that meet the at least one requirement preset in advance among the plurality of candidate topic concepts, the method further comprising:

deleting, through calling and executing the program stored in the memory by the one or more processors, a target candidate topic concept from filtered candidate topic concepts according to a target template, wherein one of (i) in a case that the target template is an inaccurate topic concept template, the target candidate topic concept is a topic concept matching the target template, and (ii) in a case that the target template is an accurate topic concept template, the target candidate topic concept is a topic concept not matching the target template among the filtered candidate topic concepts.

* * * * *